United States Patent [19]

Weisend, Jr. et al.

[11] Patent Number: 5,022,611

[45] Date of Patent: Jun. 11, 1991

[54] DE-ICER

[75] Inventors: Norbert A. Weisend, Jr., Cuyahoga Falls; Paul G. Tritt, Norton, both of Ohio

[73] Assignee: The B. F. Goodrich Company, Akron, Ohio

[21] Appl. No.: 462,210

[22] Filed: Jan. 9, 1990

[51] Int. Cl.$^5$ ........................ B64D 15/16; B64D 15/00
[52] U.S. Cl. .............................. 244/134 A; 244/134 R
[58] Field of Search ...................... 244/134 A, 134 R; 137/624.14, 625.66, 505.41

[56] References Cited

U.S. PATENT DOCUMENTS

| | | | |
|---|---|---|---|
| 2,515,519 | 7/1950 | Lawrence et al. | 244/134 A |
| 3,263,702 | 8/1966 | Pullen et al. | 244/134 R X |
| 4,733,834 | 3/1988 | Phillips, II | 244/134 A X |
| 4,747,575 | 5/1988 | Putt et al. | 244/134 R X |
| 4,865,291 | 9/1989 | Briscoe et al. | 244/134 A X |

FOREIGN PATENT DOCUMENTS 173162  3/1986  European Pat. Off. ........ 244/134 A

Primary Examiner—Joseph F. Peters, Jr.
Assistant Examiner—James M. Kannofsky
Attorney, Agent, or Firm—Joseph Januszkiewicz

[57] ABSTRACT

A pressure limiter valve for regulating the inflation and deflation of inflatable tubes of a deicer wherein such valve has a housing with a central chamber with inlet and outlet ports communicating therewith. The inlet port is selectively subjected to a vacuum or a fluid pressure. An annular shoulder with a central aperture separates the ports so that a piston moveable within the bore between a first position and a second position can seat on the shoulder and isolate the ports. The one face of the piston has a first and second operative surface wherein the first operative surface communicates at all times to the inlet port via a passageway so that when the force on such first operative surface is slightly greater than a piston biasing force the piston is in a first position which causes the piston to expose both operative surfaces to the fluid pressure from the inlet port. When the inlet port is subjected to a vacuum then the piston moves to a second position and only the first operative surface is in communication with the inlet port while the inlet port remains in communication with the outlet port.

6 Claims, 4 Drawing Sheets

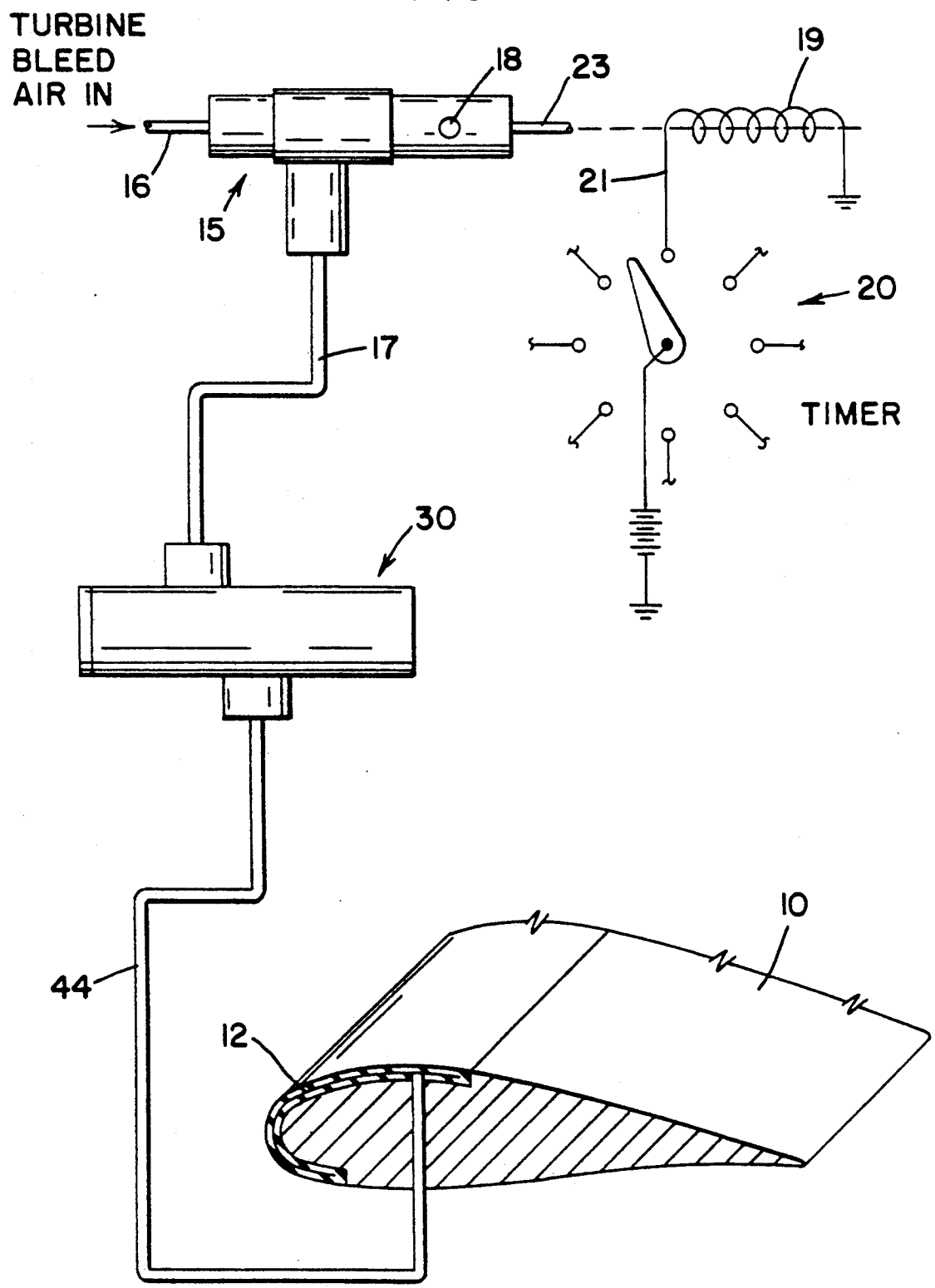

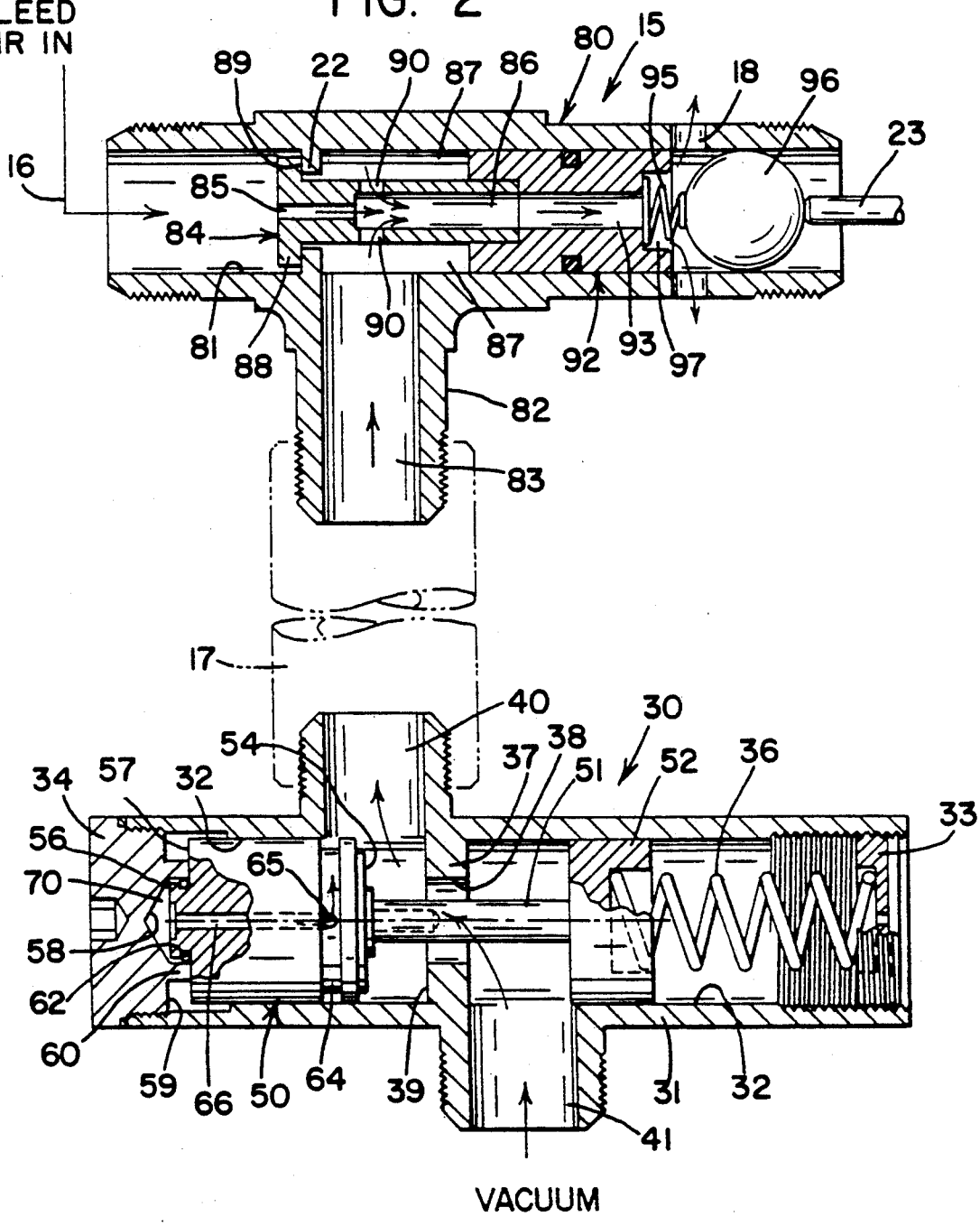

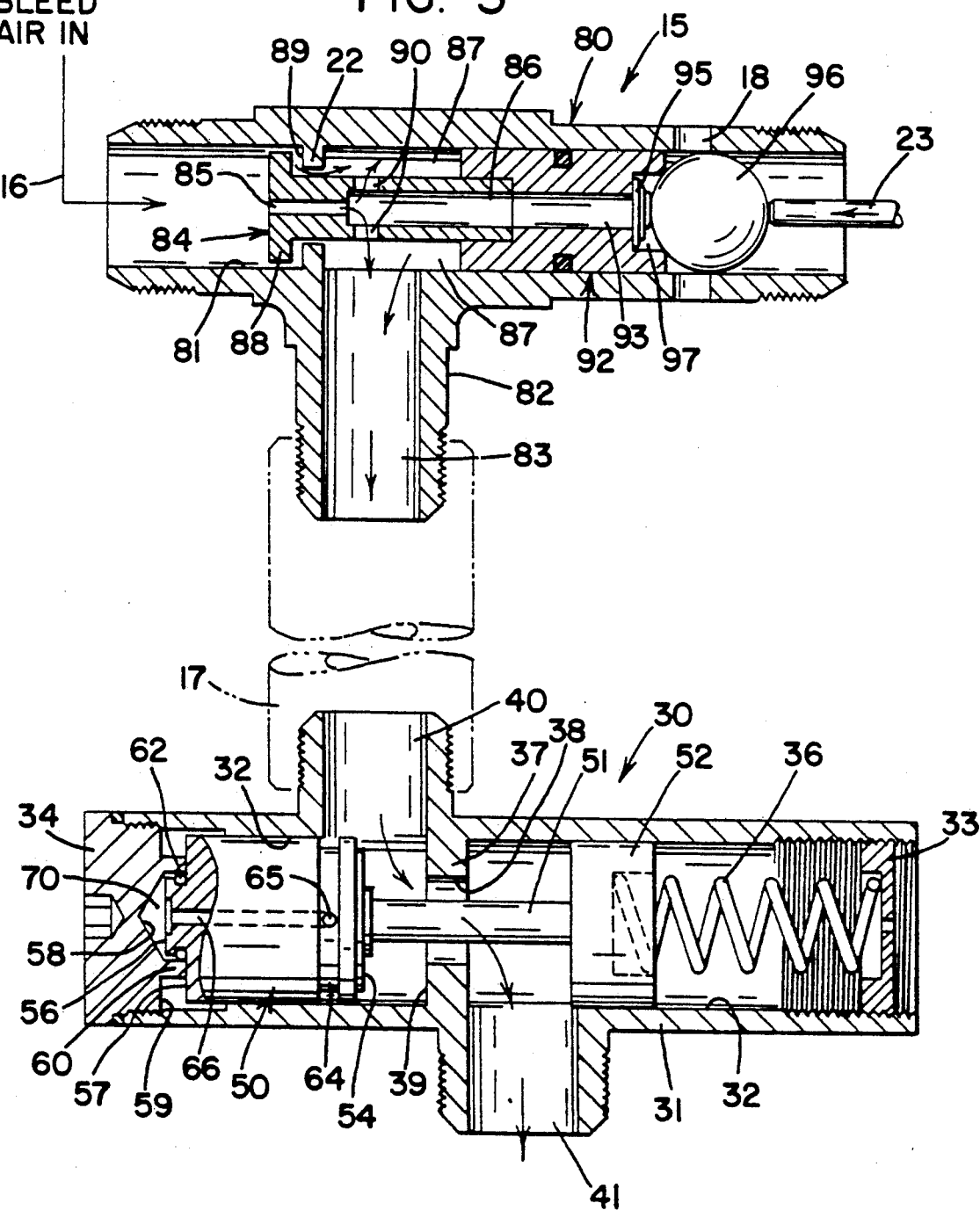

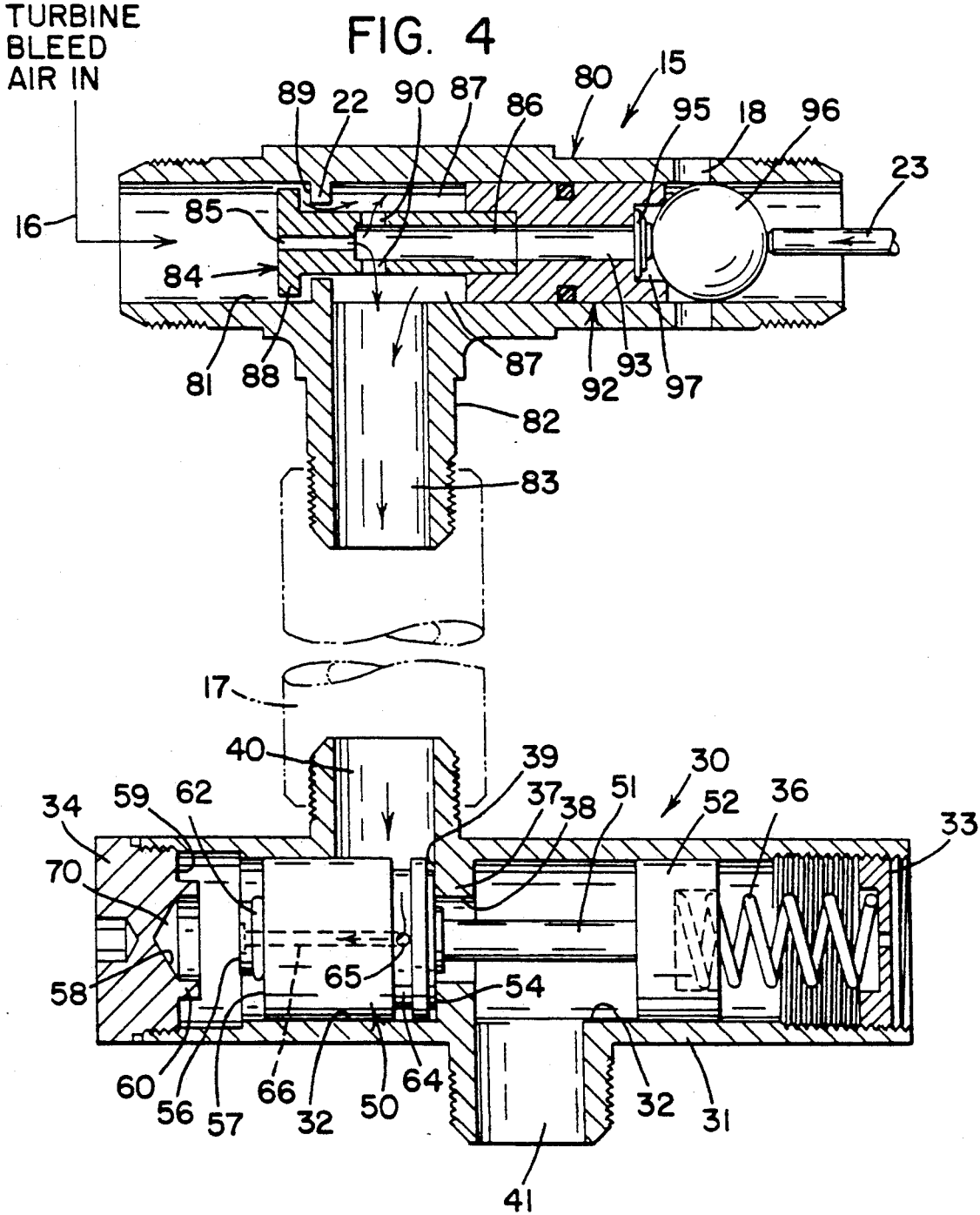

DE-ICER

BACKGROUND OF THE INVENTION

This invention relates to a pressure limiter valve for use in the control of inflating and deflating the deicer pad of an airfoil utilizing low pressure unregulated air.

Under certain atmospheric conditions, ice will form and accumulate on the leading edge of an aircraft wing, struts, stabilizers and propellers. In the discussion hereinafter reference to these parts will be made as airfoil and the description will be directed to the wing of an airplane, it being understood that such description is equally applicable to the aircraft struts, stabilizers or propellers. A deicer pad is the inflatable and resilient extensible units mounted on the leading edge of the airfoil and its repeated inflation and deflation prevents the accumulation of ice on the airfoil. Such accumulation of ice is undesirable as it adds weight to the aircraft as well as alters the aerodynamics configurations of the airfoil to change materially the efficiency thereof.

To break up the ice formation on the wings of an aircraft, pneumatic deicing equipment such as deicer pads or boots are employed utilizing a series of resilient inflatable tubes covering the leading edge area of the wings to deice them. An air supply system is used to alternately inflate and deflate the tubes to flex the deicer pad. Such repetitive flexing action shatters or breaks up the ice formation or layers as they form on the leading edge of the deicer pad and are broken into particles, which ice particles are blown off by the airstream moving over the airfoil.

Since icing conditions exist only for a relatively small portion of the total aircraft flight time it is necessary during non-deicing use to maintain a vacuum on the tubes to assure a smooth exterior surface on the deicing pad. Irregularities on the deicer pad would seriously reduce aircraft performance and efficiency by creating unwanted air turbulence. To effect a positive pressure into the tubes of the deicer pad, a solenoid operated valve upon actuation is operative to direct pressurized air thereto in cooperation with a pressure regulator which is used to maintain a predetermined air pressure to the deicer system. Under normal conditions the air supply for the deicer is the bleeding off of a very small portion of the pressurized air from the compressor section of the aircraft's turbine engine. Under certain operating conditions, the bleed off pressure can drop to a pressure equal to or slightly less than the deicer system value. As the supply pressure drops to pressures lower than the needed pressure, the pressure regulator becomes restricted and the deicer inflation flow of air is reduced substantially and impairs the proper functioning of the deicer pad. The present invention is directed to the elimination of the need for a pressure regulator and thus in effect uses unregulated air pressure to insure the proper functioning of the deicer by utilizing the available source of air pressure to inflate the pneumatic deicer rapidly, especially when the source pressure is near deicer operating pressure. The pressure limiter of the present invention overcomes the limitation of present pneumatic deicer systems operating components that result in deicer inflation that is too slow for effective performance when the air supply pressure is low in the turbine engine's bleed system. Such pressure limiter valve utilizes all available source of air pressure and flow to inflate pneumatic de-icers rapidly, especially when the source pressure is near de-icer operating pressure. Such pressure valve is particularly useful as it eliminates the need for a pressure regulator.

SUMMARY OF THE INVENTION

A pressure limiter valve that is used in controlling the inflation and deflation of the inflatable tubes in a deicer pad wherein the valve has a housing with a central chamber with an annular shoulder that lies between an inlet and outlet ports connected to such chamber. A moveable piston means is operative to selectively close off the communication between the input and output ports in response to a self-actuating portion of the piston which has a vent opening and passageway that communicates with a portion of the piston and upon a predetermined pressure build up there, operates to unseat the piston and expose a larger area to effect a rapid movement of the piston to seal communication between the input and output ports.

BRIEF DESCRIPTION OF THE DRAWINGS

FIG. 1 is a diagrammatic view of a portion of an airplane's wing with a deicer pad and a control circuit for the inflation and deflation of the deicer pad;

FIG. 2 is a cross sectional view of a pressure limiter valve and an air valve in a condition of pulling a vacuum on the deicer pad;

FIG. 3 is a cross sectional view of a pressure limiter valve in a condition for inflating the deicer pads; and FIG. 4 is a cross sectional view of the pressure limiter valve in a non-flow condition after inflation of the deicer pad;

DETAILED DESCRIPTION

Referring to the drawings wherein like reference numerals designate like or corresponding parts throughout the several views, there is shown in FIG. 1 a portion of an airplane wing 10 having a leading edge upon which is mounted a deicer pad 12, only a portion of which is shown. Such deicer pad 12 has a plurality of inflatable tubes or passageways covered by an extensible, flexible and elastic structure of rubber or rubber like material reinforced with fabric. The distension of such tubes or passageways break up the ice accumulated on the deicer pad in a manner old and well known in the art.

A solenoid valve 15 has its inlet connected to a conduit 16 which delivers pressurized air as from a bleed off from a turbine engine that is suitably attached to the fuselage of the airplane. Such bleed off is a very small portion of the pressurized air from the turbine's engine.

The solenoid valve 15 for purposes of this invention will be described generally in that its basic operation is that in the actuated condition, it directs pressurized air from conduit 16 to conduit 17, and in the deactuated condition it directs pressurized air from conduit 16 to exhaust ports 18 which action creates and pulls a vacuum on conduit 17.

Solenoid valve 15 is actuated or deactuated into either of the above conditions by the operation of a coil 19 and a timer 20. To place the deicer control into operation the operator actuates the timer 20 such that timer switch will upon the preset time, send an electrical current via line 21 to energize coil 19, which then pushes rod 23 leftward as viewed in FIG. 1 to actuate solenoid valve 15 to send pressurized air from conduit 16 into conduit 17 for movement into a control valve 30. When the coil 22 is de-energized, rod 23 is moved rightward such that solenoid valve 15 will direct the pressurized air from conduit 16 to exhaust ports 18 such that a vacuum is created and pulled in conduit 17 and control valve 30.

Control valve 30 is a generally cylindrical housing 31 with a longitudinally extending central bore 32 which is threaded at both ends to receive threaded plugs 33 and 34 to define a chamber. One end of such housing 31 has a spring 36 mounted in the bore 32 in abutting contact with plug 33.

Internal central bore or chamber 32 of housing 31 has an annular flange 37 presenting a central aperture 38 or orifice and an annular shoulder 39. Cylindrical housing 31 has an inlet port 40 that communicates with the central bore or chamber 32 and an outlet port 41 that also communicates with the central bore or chamber 32 and a conduit 44, which in turn communicates with the inflatable tubes of the deicer pad 12 on the airplane's wing 10. Inlet port 40 communicates with the conduit 17 that either receives pressurized air or a vacuum. The inlet port 40 is located on one side of the annular flange 37 while outlet port 41 is located on the other side of the annular flange 37.

A piston 50 is slidably mounted in the chamber or central bore 32, having its piston rod 51 extending through central aperture 38 for connecting to a piston 52. In the normal position of piston 50 as shown in FIG. 2, the central bore 32 and piston rod 51 cooperate to communicate ports 40 and 41. Piston 50 has a pair of oppositely disposed operating surfaces, one of which is designated 54. Such operating surface or face 54 is movable into and out of abutting engagement or seating with annular shoulder 39 to close off aperture 38. The other operating surface or face of piston 50 has a first or circular operative surface or face 56 located centrally thereon and a second or annular operative surface or face 57. Such operative surfaces 56 and 57 are axially spaced from each other to present a stepped end to such piston 50. Plug 34 has a central recess 58 and an outer annular recess 59, presentinq an annular shoulder 60 therebetween. Central recess 58 (FIG. 2) receives the first or circular operative face 56 while the annular shoulder 60 is adapted to engage the annular operative face 57 of piston 50. To facilitate the sealing engagement of such faces 56 and 57 of piston 50 on their respective portions of the recesses 58 and 59, a circumferential groove is placed into such stepped end of such piston to receive an annular seal 62 which engages the side wall of central recess 58 in plug 34 for a purpose to be described.

A circumferential groove 64 on piston 50 adjacent to the one operating surface 54 has a vent hole or bore 65 which communicates via a passageway 66 in piston 50 to the circular operative face 56 thereon and directly with the central recess 58 in plug 34. Such passageway 66 and bore 65 keep open communication at all times between inlet port 40 and central recess 58. In addition to recess 58, the plug 34 has an additional recess or a central chamber 70 so that when piston 50 is in its leftwardmost position (FIG. 2) the pressure or vacuum via port 40 communicates via vent hole 65 and passageway 66 to such circular operative face 56.

Piston 52 is recessed on one face to receive the one end of spring 36 which biases the piston 52 and 50 leftwardly as seen in FIG. 2 such that the stepped end portion of piston 50 is seated in recesses 58 and 59. Plug 33 can be adjusted axially in the threaded end portion of housing 31 to thereby adjust the force necessary to overcome the compression of spring 36 on pistons 50 and 51.

A brief description of control valve 15 follows, since the invention is directed to the pressure limiter valve. As described above the control valve 15 either supplies pressurized air or pulls a vacuum on inlet port 40. Control valve 15 has a housing 80 with a central bore 81 and an annular member 22 fixedly mounted therein. Housing 80 has a tubular portion 82 extending at right angles therefrom with a central bore or outlet bore 83 communicating directly with inlet port 40 via line 17. Slidably mounted in one end of central bore 81 is a spool valve 84, which has a passageway or orifice 85 communicating with a larger second bore 86. Annular member 22 forms an annular chamber 87 in cooperation with the interior bore 81 of housing 80 and the exterior surface of spool valve 84. A flange 88 is located in the one end of spool valve 84, which in its normal condition of operation seats against an annular shoulder 89 to thereby direct the flow of pressurized air from conduit 16 to the central bore 81 and thence into a passageway 85. Spool valve 84 has a plurality of circumferentially spaced bores 90 located downstream from the passageway 85 to communicate the pressurized air flowing through passageway 85 and through passageway 86 to create and pull a vacuum thereon, which vacuum or suction is pulled into annular chamber 87 and bore 83.

An annular sleeve 92 is suitably secured to the other end of spool valve 84 (to be integral therewith) and has a central bore 93 substantially the same diameter as the passageway 86 in spool valve 84 which is adjacent thereto. The other end of annular sleeve 92 is recessed to provide a seat for a spring 95 which biases a ball valve 96 away from a port 97, which port 97 is formed by central bore 93 at the other end of sleeve 92. Ball valve 96 is in contact with the rod 23. In the position shown in FIG. 2, ball valve 96 is unseated from port 97, but upon energization of the coil 19, as described, rod 23 will move ball valve 96 into the position to close port 97 and the turbine bleed air via conduit 16 will pass through the clearance space between the inner surface of passageway 81 of housing 80 and the exterior surface of flange 88 located at the one end of spool 84, thence between the clearance space between annular member 22 and the flange 88 for passage into annular chamber 87 and thence via bore 83 to a valve 30.

In the operation of the control valve 30, the operator will first actuate timer 20. When the timer is first actuated and while the timer is still in the inoperative mode, a low volume of unregulated pressurized air is bled off from the compressor section of the aircraft's turbine engine via conduit 16 to the control valve 15, which pressurized air flows to exhaust ports 18. During the flow of such pressurized air a suction is pulled via bores 90 and bore 83 on the inlet to conduit 17 which leads to the inlet port 40 of control valve 30. Inlet port 40 as shown by FIG. 2 communicates past piston 50 with outlet port 41 which communicates via conduit 44 to the deicer pad 12 on the airplane wing 10 to maintain the inflatable tubes therein in a deflated condition. Upon the preset time after the actuation of timer 20, an electrical current via line 21 will be sent to energize coil 19, which then pushes rod 23 leftward as viewed in FIGS. 3 and 4, to actuate solenoid valve 15 to send pressurized air from conduit 16 (around flange 88 and via chamber 87) into conduit 17 for passage into control valve 30. Such pressurized air will flow past piston 50, which is kept in the leftward position as viewed in FIG. 3 by spring 36, and thence past outlet port 41 to the inflatable tubes in the deicer pad 12. Simultaneously with this action pressurized air will flow via vent hole 65 and via passageway 66 in piston 50 to the circular operative face 56 and the chamber 70 defined by such face 56 and the central recess 58 in plug 34. When sufficient pressure builds up in chamber 70, which occurs after the inflatable tubes in deicer pad 12 are inflated, to overcome the bias of spring 36, piston 50 will be moved slightly rightward (as viewed in FIG. 3) to expose the entire surface area of piston 50 which includes the first or circular operative surface or face 56 and the second or annular operative surface of face 57 which then allows a rapid build up of pressure to overcome the full force of spring 36 to rapidly move the pistons 50 and 52 rightwardly as viewed in FIG. 3, from the position shown in FIG. 3 to the position shown in FIG. 4 to seat the enlarged operating face or the one operating surface 54 of piston 50 onto annular shoulder or seat 39. This action locks the pressurized air in the inflatable tubes of the deicer until the timer breaks the flow of current to electrical line 21 and deenergizes coil 19 which moves rod 23 to divert the pressurized turbine bleed off air from conduit 16 to exhaust ports 18 and thereby pulls a vacuum on conduit 17 which in turn pulls a vacuum on inlet port 40 (as viewed in FIG. 2). This vacuum pull also draws a vacuum on vent hole 65 which in turn draws a vacuum through passageway 66 and onto chamber 70. When the pressure in such chamber 70 is depleted, the pressurized air trapped in the valve 30 and the tubes of the deicer pad in cooperation with the spring 36 will move the piston 50 leftwardly as viewed in FIG. 2 to thereby exhaust the pressurized air to collapse the tubes in the deicer pad 12.

This described action will be repeated by the dictates of the timer 20 making the next contact with a line leading to energize coil 19.

Various modifications are contemplated and may be resorted to by those skilled in the art without departing from the described invention as hereinafter defined by the appended claims as only a preferred embodiment thereof has been disclosed.

I claim:

1. A pressure limiter valve for regulating the inflation and deflation of inflatable tubes of a pneumatic deicer, said valve having a housing with a central chamber, said housing having an inlet port and an outlet port communicating with said central chamber, said housing having an annular abutment in said chamber located between said inlet port and said outlet port, a piston with two opposed faces located in said central chamber, biasing means connected to said piston to maintain said piston in a first position to maintain communication between said ports, one face of said piston moveable into a second position for engagement with said abutment to close off communication between said ports, said housing having a second chamber operatively connected to said inlet port to maintain a pressure in said second chamber that is equal to the pressure existing in said inlet port at all times.

2. A pressure limiter valve for regulating the inflation and deflation of inflatable tubes as set forth in claim 1 wherein the other one of said faces is stepped to define a first operative face and a second operative face, and said first operative face communicates directly with said second chamber in said first position of said piston.

3. A pressure limiter valve for regulating the inflation and deflation of inflatable tubes as set forth in claim 2 wherein said second operative face communicates with said second chamber when the force in said second chamber is greater than said biasing means to thereby rapidly move said one face into engagement with said abutment and expose said first and second faces to said second chamber and the pressure of said inlet port.

4. A pressure limiter valve for regulating the inflation and deflation of inflatable tubes as set forth in claim 3 wherein said piston has passageway means connecting said second chamber to said inlet port.

5. A pressure limiter valve for regulating the inflation and deflation of inflatable tubes as set forth in claim 4 wherein said housing has means for adjusting the force of said biasing means.

6. A pressure limiter valve for regulating the inflation and deflation of inflatable tubes of a pneumatic deicer; said valve having a housing with a central chamber; said housing having an inlet port and an outlet port connected to said chamber with said inlet port selectively connectable to a pressure source or a vacuum; said outlet port connected to said tubes of a deicer; an annular shoulder in said chamber defining an aperture; said inlet port and said outlet port being located on opposite sides of said annular shoulder; piston means moveable in said chamber between a first position and a second position, said piston means having a piston head with spaced operating faces; one of said faces operative in said first position to seat on said annular shoulder to close off said orifice; said other face of said piston head having a first operative surface and a second operative surface; an opening in said piston head communicating with a passageway that extends into said piston head and opens into and on said first operative surface; said opening communicating with said inlet port when said piston means is in said first position or said second position, biasing means mounted in said chamber to bias said piston means into said second position which places said first operative surface in sole communication with said passageway and said inlet and outlet ports, and said second and first surfaces being in sole communication with said inlet means when the force on said first surface of said piston head is slightly greater than said force of said biasing means.

* * * * *